(12) United States Patent
Cloud

(10) Patent No.: US 6,188,482 B1
(45) Date of Patent: Feb. 13, 2001

(54) APPARATUS FOR ELECTRONIC SPECKLE PATTERN INTERFEROMETRY

(75) Inventor: Gary L. Cloud, East Lansing, MI (US)

(73) Assignee: Board of Trustees operating Michigan State University, East Lansing, MI (US)

(*) Notice: Under 35 U.S.C. 154(b), the term of this patent shall be extended for 0 days.

(21) Appl. No.: 09/363,494

(22) Filed: Jul. 29, 1999

Related U.S. Application Data

(60) Provisional application No. 60/100,936, filed on Sep. 18, 1998.

(51) Int. Cl.[7] ................................................ G01B 9/02
(52) U.S. Cl. ............................................ 356/491; 356/495
(58) Field of Search .................................. 356/345, 35.5, 356/349

(56) References Cited

U.S. PATENT DOCUMENTS

| | | |
|---|---|---|
| 4,191,470 | 3/1980 | Butter . |
| 4,280,764 | 7/1981 | Sica, Jr. et al. . |
| 4,432,239 | 2/1984 | Bykov . |
| 4,850,693 | 7/1989 | Deason . |
| 4,887,899 | 12/1989 | Hung . |
| 5,004,345 | 4/1991 | Hung . |
| 5,313,265 | 5/1994 | Hayes et al. . |
| 5,506,672 | 4/1996 | Moslehi . |
| 5,508,801 | 4/1996 | Panin et al. . |
| 5,623,360 | 4/1997 | Gesell et al. . |
| 5,640,239 | 6/1997 | Takamiya et al. . |
| 5,666,197 | 9/1997 | Guerra . |
| 5,671,042 | * 9/1997 | Sciammarella ...................... 356/35.5 |

OTHER PUBLICATIONS

Gary Cloud, Optical Methods of Engineering Analysis, 1994—pp. 395–476.

* cited by examiner

*Primary Examiner*—Robert Kim
(74) *Attorney, Agent, or Firm*—Harness, Dickey & Pierce, P.L.C.

(57) ABSTRACT

Presented is a speckle interferometer for measuring displacement of an optically irregular surface of a specimen having, a laser for producing a beam of coherent radiation, an adjustable polarizing beam splitter for dividing the radiation into a first portion of the radiation and into a second portion of the radiation. The reflected radiation is then passed through a pair of collimating lenses onto the optically rough surface of the specimen. The reflection off of the specimen is captured by an imaging system that processes the reflection to measure strains on the surface.

14 Claims, 3 Drawing Sheets

APPARATUS FOR ELECTRONIC SPECKLE PATTERN INTERFEROMETRY

This application claims benefit of Provisional Application Ser. No. 60/100,936 filed Sep. 18, 1998.

BACKGROUND AND SUMMARY OF THE INVENTION

This invention relates to interferometry, and more particularly to a speckle interferometer apparatus and method that utilizes a scattering reference plate that can incorporate phase shifting.

Optical interferometers are known which make use of the interference phenomena known as the "speckle effect," the speckled pattern seen when laser light is used to illuminate a rough surface. This invention utilizes the speckle effect, but it offers significant cost and performance improvements over conventional apparatus and methods.

U.S. Pat. No. 4,850,693 teaches a compact and portable moiré interferometer for determining surface deformations of an object; and U.S. Pat. No. 4,794,550 teaches a method of extending the measurement range of the moiré reference beam techniques by constraining the reconstruction of a surface contour based on a prior knowledge about the surface. These moire methods require that some form of a grating be created or projected onto the surface of the specimen, perhaps by the use of coherent laser light.

The physics of this invention are distinctly different from moire techniques. This invention measures deformations, displacements, and strains of an object, but it does not employ the "moire effect," in that no grating is created on the specimen or in the optical system. Only the "speckle effect" is used.

Speckle interferometry is known for use in measuring strain in structural members and mechanical components. U.S. Pat. No. 4,591,996 teaches a method and apparatus for measuring strain in structural members utilizing a laser beam to illuminate a surface being analyzed and an optical data digitizer to sense a signal provided by the light beam reflected from the illuminated surface. The optical data digitizer is used to compare the signal received from the surface in a reference condition to subsequent signals received from the surface after surface deformation.

As in known in the art, data from the interference speckle can be used in several ways. While the specimen is stretched, the speckles translate indicating in-plane displacement and also vary in intensity indicating out-of-plane displacement. Due to the nature of materials, it can be assumed that changes from one speckle to an adjacent one are small and therefore linear. Because of this, contour maps of displacements and strains, both in-plane and out-of-plane can be constructed. The mathematical theorems and explanations of the recombination of object and reference beams are known in the art and are further described in a publication of the inventor, *Optical Methods of Engineering Analysis*, Cambridge University Press 1995, Gary Cloud, which is expressly incorporated herein by reference.

The speckle is itself an interference phenomenon. The formation of speckles in imaging systems can be described at any image region as the superimposition result of the coherent point spread functions for adjacent object points. The speckle created by imaging optics is referred to as a "subjective" speckle. The nature of the illuminated surface gives rise to two different classes of speckle patterns. One class is called the "fully developed" speckle pattern; it develops only from interference of light that is all polarized in the same manner. The speckle field itself will then be similarly polarized. Surfaces at which polarized light is singly scattered, such as matte finished metal, generally give rise to polarized speckle fields as do lightly scattering transmission elements such as ground glass. Matte white paint surfaces or opal glass, into which the light penetrates and is multiply scattered, depolarize the light and thus do not generate a fully developed speckle pattern. The brightness distributions of the two classes of speckle patterns differ substantially, but this difference is not important in the functioning of speckle interferometry systems.

The mixed speckle pattern is recorded by the imaging system. The specimen is then subjected to a load, which causes displacement of the specimen's surface. This displacement causes changes in location and brightness of the various speckles. These newly changed speckles are again recorded by the imaging system. A computer connected to the camera captures the images and calculates displacements and strains on the object's surface based on the changes in the speckle pattern. The actual displacement and strain components that are calculated depend on the configuration of apparatus used, as outlined below.

In one embodiment of the current invention, a uniformly bright field of coherent radiation, which is the so-called reference beam, is added to the speckle field. The addition of the reference field will affect both the size and the brightness distribution of the speckle field. When a reference beam is introduced, the size of a speckle will approximately double. The reason for this involves the interference effect of adding a uniform strong wave to the speckle pattern in the direction of the optical axis.

In this embodiment of the current invention, a beam of coherent light is split. The first portion of the beam is projected onto the surface of the specimen. An imaging lens then collects an image of the speckle pattern formed by the reflection off of the specimen surface. This image is then combined in a beam combiner with the second portion of the beam. The combined image is then captured by a camera, and the computer calculates out-of-plane displacement and strain. This embodiment is used to measure out-of-plane displacement and strain. The data are independent of in-plane displacement as long as the angles of illumination and viewing of the specimen are held in the range 0–10 degrees.

In another embodiment of the invention, a beam of coherent light is split. The first portion of the beam is projected onto the surface of the specimen at a certain angle from the line of viewing. The second portion of the beam is projected onto the surface of the specimen at the opposite angle from the line of viewing. Thus, two beams are used to illuminate the specimen at equal and opposite angles of illumination. The resultant speckle pattern is recorded by the imaging system for before-load and after-load states. The computer calculates in-plane displacement and strain. In this embodiment, the changes in the speckle pattern depend only on in-plane displacement and strain for any angles of incidence, as long as the setup is symmetric with respect to the viewing axis.

The disclosed speckle interferometer system is thus very good at measuring both in-plane and out-of-plane displacements. The setup and function of the two embodiments of the system are different, but both embodiments utilize changes of brightness of individual speckles as the specimen is deformed.

Optionally included is a capability that allows for the regulated change in phase of one of the divided beams. This allows the imaging system to take additional brightness data for a given speckle and calculate precisely the displacement for that speckle without the necessity of creating fringe patterns. As such, the current system provides an efficient non-contacting system that can measure both in-plane and out-of-plane translation of the surface of a specimen.

In view of the above description it is an object of this invention to provide a method and apparatus for measurement of strains in structures of all kinds.

It is further an object of the present invention to measure the relative magnitude of displacements from an original position on different points on a surface of an object under stress.

It is yet another object of the present invention to provide an improved technique and apparatus for performing electronic speckle pattern interferometer in the analysis of motion, strain, and deformation of all kinds of structures, components, bodies and materials.

It is yet another object of the present invention to provide a speckle interferometer which will be useful in engineering, manufacturing, medicine, and natural science to provide precise measurements without the necessity of heavy investment in equipment; and, in its commercial form, can be used by untrained persons in field and industrial environments.

It is yet another object of the present invention to provide an interferometer which is greatly simplified in comparison to traditional setups and is more resistant to vibration and other noises which tend to contaminate the result produced by an electronic speckle pattern interferometer.

It is yet another object of the present invention to provide an interferometer apparatus which affords the capability of placing the illumination sources, (the fiber terminations) on a testing machine or even attaching them to the specimen; while the laser and other components are at a separate locations. In this way, remote measurement of strain in hostile environments can be conducted.

It is yet another object of the present invention to provide an interferometer apparatus which is set up to measure in-plane displacement or strains.

It is yet another object of the present invention to provide an interferometer apparatus that optionally contains collimating lenses for more accurately measuring in-plane or out-of-plane displacement.

It is yet another object of the present invention to provide an interferometer apparatus that contains a phase shifter along one of the fiber optic cables for changing the phase of one of the laser beams to improve strain measurements in the systems.

It is yet another object of the present invention to provide a method and apparatus for the control, analysis and calibration of the phase shifting, the development of displacement maps, determination of specimen displacements, extraction of signal noise from the signal, calculation of strain from displacements maps, and display of displacement and strain maps performed by a computer.

It is yet another object of the present invention to provide an interferometer apparatus utilizing the speckle effect having a phase shifter disposed before the specimen. The speckle interferometer includes a laser, an integrated monobloc adjustable beam splitter and fiber optic coupler, a second adjustable fiber optic splitter, a phase shifter, and a recording medium.

The foregoing as well as other objects, features and advantages of the present invention will become more apparent from the following detailed description when taken in conjunction with the appended drawings.

DETAILED DESCRIPTION OF THE INVENTION

The present invention uses the techniques of the speckle interferometer method. In accordance with this method, all necessary information to compute displacements and strains in an arbitrary shaped and oriented surface is determined by recording two or more images of an illuminated surface.

In one embodiment, fringes occur upon making a pair of exposures of the interference patterns made before and after deformation of a rough surface. The relative magnitude of the displacements and strains from the original position at different points on the surface can be determined from the position of, movement, and changes in intensity of the fringes.

In another embodiment, phase shifting is used to precisely determine the displacements and strains. In this case, several images are captured before and after deformation of the specimen surface, each image being taken with an arbitrary phase shift.

Figure 1:
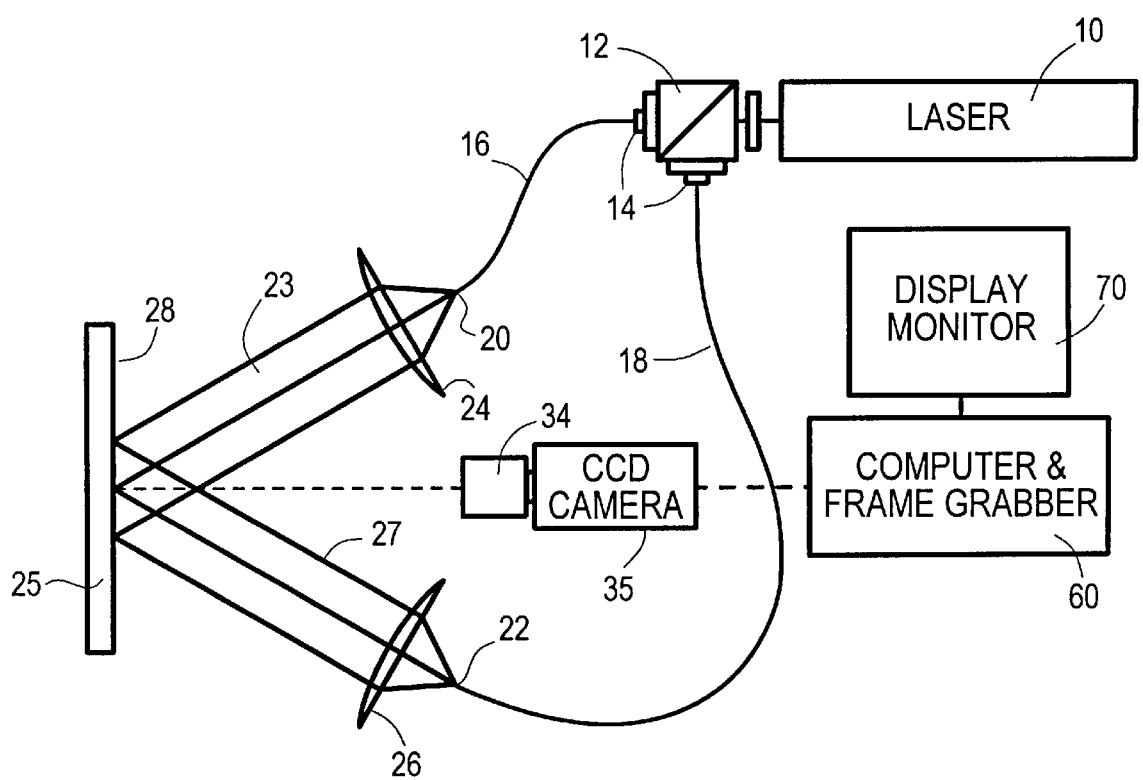
FIG. 1 is a schematic diagram of the apparatus of the invention.

FIG. 1 shows a schematic representation of an electronic speckle pattern interferometer being one embodiment of this invention. From a functional point of view, the system comprises the following components: an illumination system 10; a commercially available adjustable polarizing beam splitter fiber coupler 12; a pair of fiber optics 16, 18 coupled with collimating lenses 24, 26. The illumination system can be a standard HeNe laser, an ion laser, compact solid-state laser, or a laser diode. The system further comprises a CCD camera 35 having a lens 34 coupled to a computer and frame grabber 60 having a display monitor 70. Of course, other imaging systems utilizing traditional film cameras or video equipment are usable and equivalent.

As best seen in FIG. 1, the laser 10 produces a beam which is split into two object beams by the beam splitter fiber coupler 12 and transmitted through fibers 16 and 18. The beams then leave the fibers 16, 18 and pass through optional filters 20, 22 and preferably enter collimating lenses 24, 26. It has been observed that the addition of collimating lenses improves the accuracy of the system by 20% in comparison to a system without collimating lenses. The beams 23, 27 leave the collimating lenses 24, 26 and are overlappingly projected onto the test specimen's 25 surface 28. The combined light beams reflect off of surface 28 forming a speckled pattern. The lens 34 with CCD camera 35 captures an image of the speckle pattern. This image is received and processed by the computer and accompanying frame grabber 60. The image is then stored within the computer 60 for use in strain calculations. In operation, the use of a second object beam as carried by fiber 18 when allowed to overlap the illuminated portion of the beam as carried by fiber 16 will allow the computation of in-plane displacement of a specimen 25 while the specimen 25 is subject to loading. In this configuration, the critical changes of speckle brightness are not affected by out-of-plane displacement.

The specimen is then subject to loading. This causes deformation of the specimen which leads to the movement of the specimen's surface 28. This movement causes variation of the individual speckles by in-plane displacement. The imaging system then captures the image of the modified speckle pattern. The imaging system then analyzes the images and calculates the change in brightness of each individual speckle. A calculation is made which converts the change of brightness into a map of the strain on the specimen's surface 28. In this case the specimen surface displacement is represented by a system of fringes.

Figure 2:
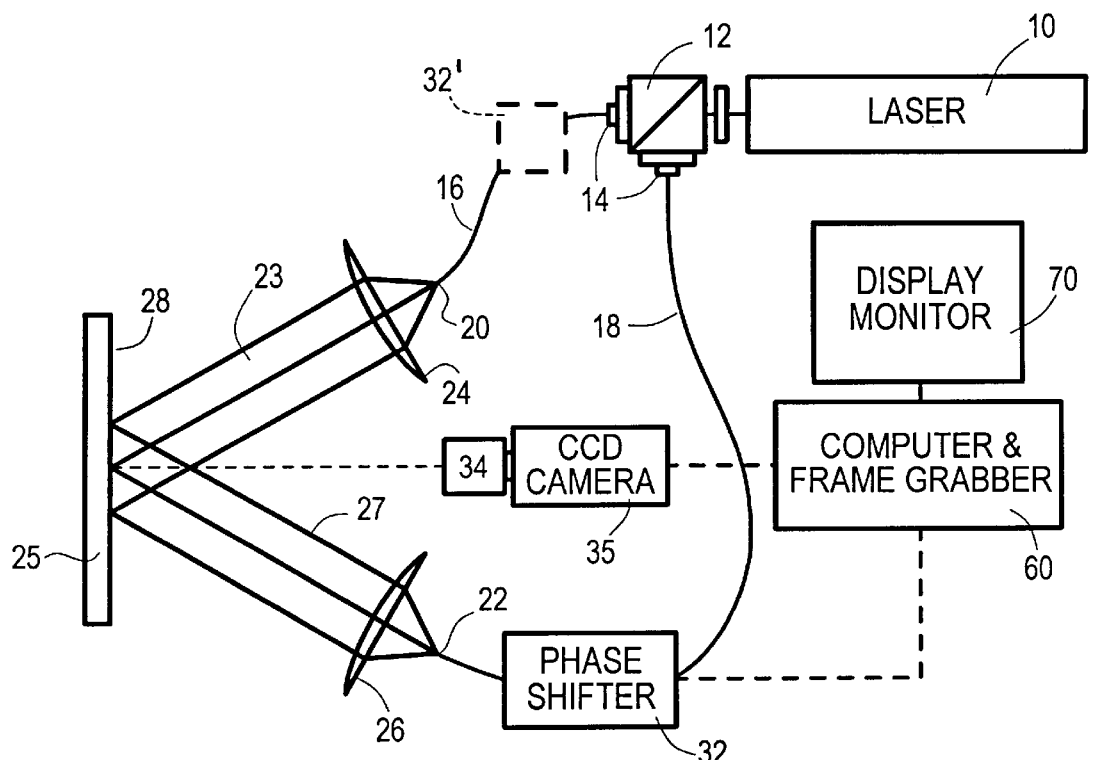
FIG. 2 is a schematic diagram of an alternate embodiment of the apparatus of the invention.

As best seen in FIG. 2, a PZT phase shifter 32, or optionally 32', can be utilized to stretch a length of fiber on one branch of the optical path. As known in the art, at least three images using the phase shifter are taken before the specimen is subjected to stress and the same number of images are taken after. This information is used by the computer to calculate a precise contour map of the displacements on the specimen 25 using methods well known in the art.

As previously mentioned, the addition of collimating lenses 24 and 26 allow for an accurate reading over the whole field as opposed to the described system without collimating lenses. This is particularly true in systems utilizing a phase shifter 32. It is also possible to control the phase shift of one of the beams in the fiber by using a heat source to control the length of the fiber.

Figure 3:
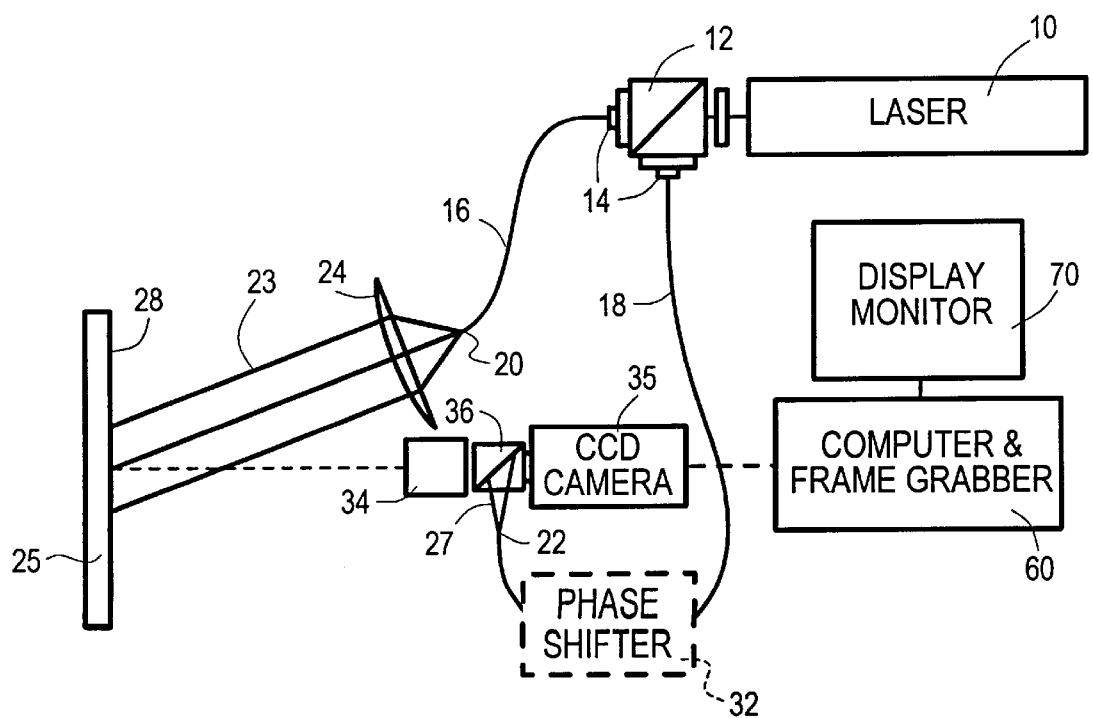
FIG. 3 is further an alternative embodiment of the apparatus of the invention.

Yet a further embodiment of the current invention can be seen in FIG. 3. In the current configuration of the interferometer, out-of-plane displacements and strains can be measured with great accuracy. As shown, a laser 10 projects a light beam into the commercially available beam splitting fiber coupler 12. The beam is split into object and reference beams and sent down fiber optic cables 16 and 18. Light traveling through cable 16 exits the fiber and is collimated by collimating lens 24 to be dispersed on the surface 28 of specimen 25. The light is reflected off of surface 28 in the form of a speckle pattern and is captured by lens 34 and projected through a second beam splitter 36 into CCD camera 35. The reference beam 27 from the second fiber optic cable 18 is likewise projected through the beam combiner 36 and combined with the light reflected off of surface 28 into camera 35. In this configuration, the speckle brightnesses are affected primarily by out-of-plane motion of the specimen surface 28.

In operation, the speckle pattern reflected off of surface 28 and captured by CCD camera 35 is stored in computer 60. The specimen 25 is subject to loading causing a change in the speckle pattern. This new pattern is recorded by the CCD camera. The computer then compares the first and second stored images to calculate the resultant out-of-plane displacements and strains of the surface 28. Again, the displacements are represented by the computer as a system of fringes.

The addition of an optional PZT phase shifter 32 coupled to second fiber optic cable 18 carrying the reference beam 27 can be used to produce a precise contour map showing the out-of-plane displacement of the specimen 25 while the specimen is being subjected to loads.

Figure 4:
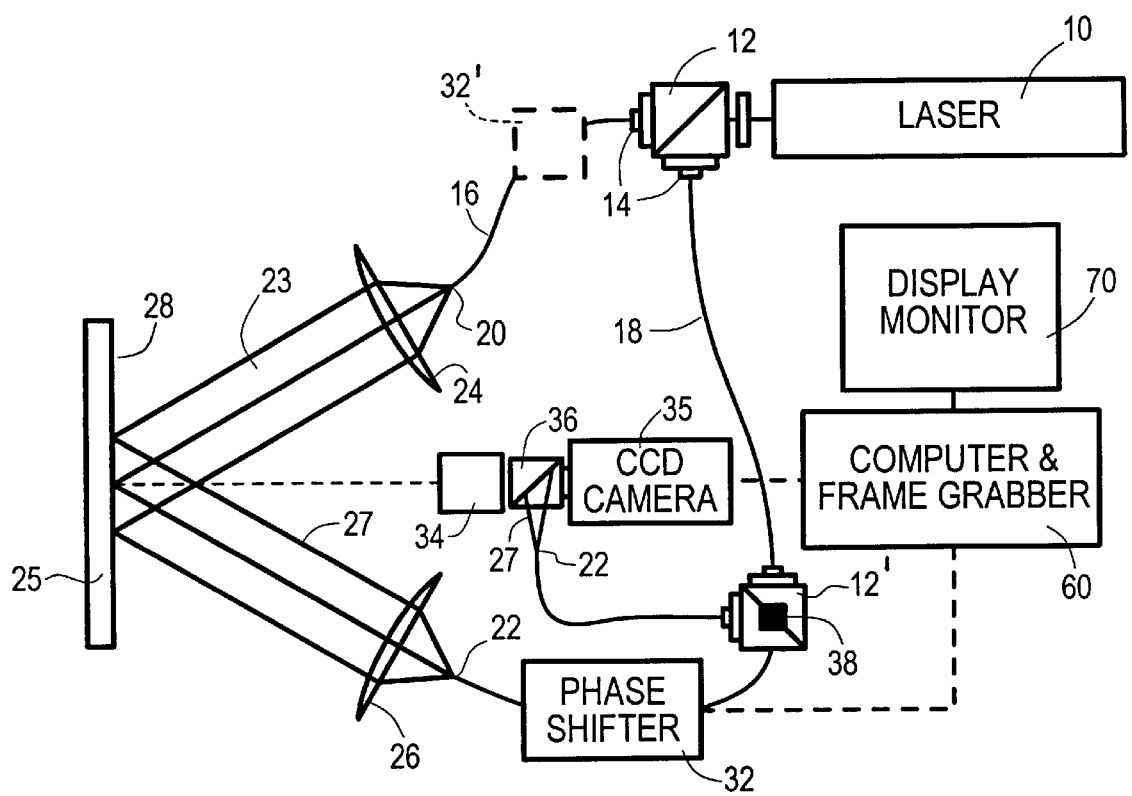
FIG. 4 is further an alternative embodiment of the apparatus of the invention.

What is envisioned as a commercially feasible embodiment of the current invention can be seen in FIG. 4. In the current configuration of the interferometer, in-plane as well as out-of-plane displacements and strains can be measured with great accuracy. This particular embodiment combines the advantages and features of the interferometers shown in FIGS. 2 and 3 with an additional beam splitter 12'. The beam splitter contains a mechanism 38 that allows light traveling along fiber 18 to be transmitted to either the beam splitter 36 or collimating lens 26. This improvement allows a single speckle interferometer system to be used to measure both in-plane and out-of-plane displacements. This is a particularly important improvement in as much the system must only be set-up and aligned once, saving significant time and effort. This improvement also allows for an interferometer in a single transportable package, which can measure in-plane and out-of-plane displacements.

When measuring in-plane displacements, mechanism 38 directs the light toward collimating lens 26. The function of the system is identical to the function of the interferometer as described in FIG. 2. To measure out-of-plane displacements, mechanism 38 directs the light away from the collimating lens 26 toward beam splitter 36. The system then functions as described in the description of FIG. 3.

The foregoing discussion discloses and describes exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A speckle interferometer for measuring displacement of an optically irregular surface of a specimen comprising:
   a radiation source for producing a beam of coherent radiation to a first location;
   an adjustable polarizing beam splitter located at the first location for receiving the radiation from the radiation source and dividing the radiation into a first portion of the radiation and into a second portion of the radiation, and reflecting the first portion of the radiation to a second location, and reflecting the second portion of the radiation to a third location;
   a first collimator located in the second location for receiving the first portion of the radiation from the beam splitter and collimating and reflecting the first portion of the radiation to a fourth location;
   a second collimator located in the third location for receiving the second portion of the radiation from the beam splitter and collimating and reflecting the second portion of the radiation to a fourth location;
   wherein the optically irregular surface of the specimen is located at the fourth location for reflecting the first and second portions of the radiation to a fifth location, the reflection of the first and second portions interfering to form a set of speckles, the speckles moving proportional to the movement of the surface; and
   an imaging system for recording the speckles and for measuring displacement of the speckles.

2. The speckle interferometer of claim 1 further including a first phase shifter for shifting the phase of the first portion of the radiation beam optically disposed between the first and second location.

3. The speckle interferometer of claim 2 further comprising a second phase shifter for shifting the phase of the second portion of the radiation beam optically disposed between the first location and the third location.

4. A speckle interferometer for measuring displacement of an optically irregular surface of a specimen comprising:
   a radiation source for producing a beam of coherent radiation to a first location;
   a beam splitter located at the first location for receiving the coherent radiation from the radiation source and dividing it into a first portion of the radiation and into a second portion of the radiation and reflecting the first portion of the radiation to a second location and the second portion of the radiation to a third location;

a first collimator located at the second location for receiving the first portion of the radiation from the beam splitter and collimating and reflecting the first portion of the radiation to a fourth location;

wherein the optically irregular surface is located at the fourth location for reflecting the first portion of the radiation to a fifth location, the reflected first portion interfering to form a first set of speckles, the speckles moving proportional to the movement of the optically irregular surface;

a lens located at the fifth location for receiving the first portion of the beam from the fourth location and reflecting it to the third location;

a beam combiner located at the third location for receiving the second portion of the radiation from the first location and the first portion of the radiation from the fifth location and reflecting the first and the second portions of the radiation to a sixth location; and an imaging system for receiving the radiation from the third location and recording information related to the speckles.

5. The speckle interferometer of claim 4 further including a first spatial filter optically located between the first and second location.

6. The speckle interferometer of claim 5 further including a spatial filter optically located between the first location and the third location.

7. The speckle interferometer of claim 4 further having a phase shifter for shifting the phase of the second portion of the radiation optically disposed between the first location and the third location.

8. The speckle interferometer of claim 4 further having a phase shifter for shifting the phase at the first part of the radiation, the phase shifter being optically disposed between the first and second location.

9. The speckle interferometer of claim 4 wherein the imaging system calculates the displacement of the speckles caused by displacement of the surface.

10. The speckle interferometer of claim 5 wherein the imaging system calculates the change in intensity of the speckles.

11. A speckle interferometer for measuring displacement of an optically irregular surface of a specimen comprising:

a radiation source for producing a beam of coherent radiation to a first location;

a first adjustable polarizing beam splitter located at the first location for receiving the radiation from the radiation source and dividing the radiation into a first portion of the radiation and into a second portion of the radiation, and reflecting the first portion of the radiation to a second location, and reflecting the second portion of the radiation to a third location;

a first collimator located in the second location for receiving the first portion of the radiation from the first beam splitter and collimating and reflecting the first portion of the radiation to a fourth location;

a second adjustable polarizing beam splitter located at the third location for receiving the second portion of radiation from the first adjustable polarizing beam splitter and directing the radiation to either one of a fifth location or a sixth location;

a second collimator located in the fifth location for receiving the second portion of the radiation from the second adjustable beam splitter and collimating and reflecting the second portion of the radiation to a fourth location;

wherein the optically irregular surface of the specimen is located at the fourth location for reflecting the first and second portions of the radiation to a seventh location, the reflection of the first and second portions interfering to form a set of speckles, the speckles moving proportional to the movement of the surface;

a beam combiner located at the sixth location for receiving the second portion of the radiation from the third location and the first portion of the radiation from the fourth location and reflecting the first and the second portions of the radiation to a seventh location; and an imaging system located at the seventh location for recording the speckles and for measuring displacement of the speckles.

12. The speckle interferometer of claim 11 further including a first phase shifter for shifting the phase of the first portion of the radiation beam optically disposed between the first and second location.

13. The speckle interferometer of claim 12 further comprising a second phase shifter for shifting the phase of the second portion of the radiation beam optically disposed between the first location and the third location.

14. The speckle interferometer of claim 12 further including a first spatial filter optically located between the first and second location.

\* \* \* \* \*

UNITED STATES PATENT AND TRADEMARK OFFICE
CERTIFICATE OF CORRECTION

PATENT NO. : 6,188,482 B1
DATED : February 13, 2001
INVENTOR(S) : G. Cloud

It is certified that error appears in the above-identified patent and that said Letters Patent is hereby corrected as shown below:

Column 4,
Line 49, after "optional" add -- spatial --

Signed and Sealed this

Eleventh Day of December, 2001

Attest:

*Nicholas P. Godici*

NICHOLAS P. GODICI
*Attesting Officer*     *Acting Director of the United States Patent and Trademark Office*